Figure 1:
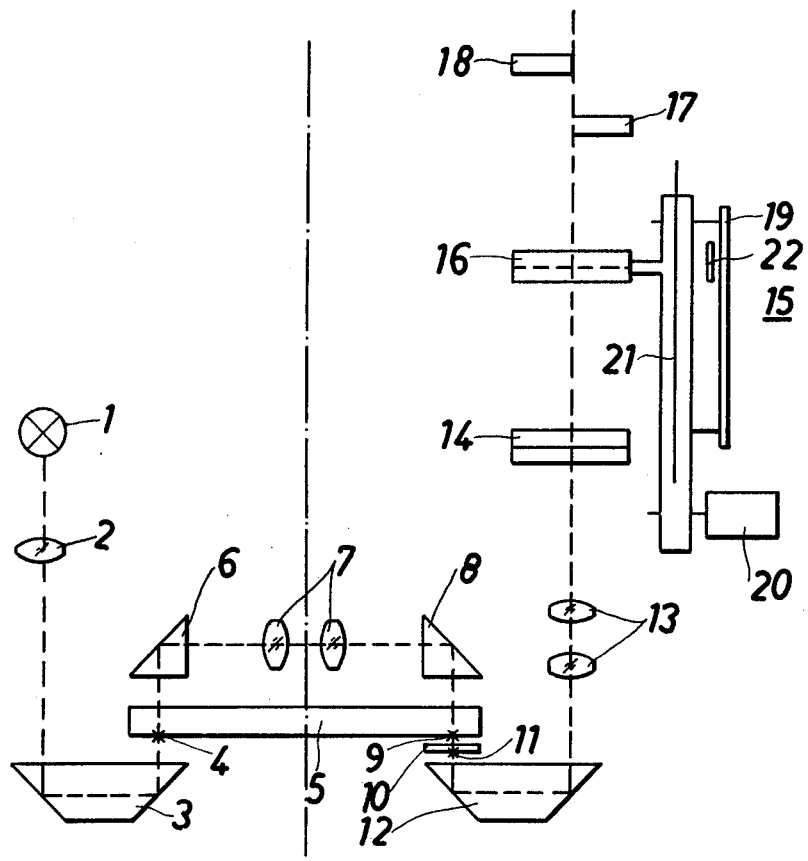

United States Patent [19]

Marold et al.

[11] 4,143,268

[45] Mar. 6, 1979

[54] ARRANGEMENT FOR MEASURING ANGLES

[75] Inventors: Thomas Marold; Wieland Feist, both of Jena, Fed. Rep. of Germany

[73] Assignee: Jenoptik Jena G.m.b.H. Jena, Jena, Fed. Rep. of Germany

[21] Appl. No.: 857,625

[22] Filed: Dec. 12, 1977

[51] Int. Cl.² ............................................. G01D 5/34
[52] U.S. Cl. .......................... 250/231 SE; 250/237 G
[58] Field of Search ........ 250/231 SE, 237 R, 237 G; 356/169, 170, 113; 324/175

[56] References Cited

U.S. PATENT DOCUMENTS

| 3,458,709 | 7/1969 | Beall | 250/231 SE |
|---|---|---|---|
| 3,562,772 | 2/1971 | Erbe | 356/169 |
| 4,064,435 | 12/1977 | Stebbins | 250/231 SE |

*Primary Examiner*—David C. Nelms

[57] ABSTRACT

An arrangement for measuring angles, particularly for use in theodolites employs light electric detectors to carry out physical measurements. An index mark which is used in the measuring operation is arranged together with at least one reading position of a graduated circle in the object plane of an imaging system. The latter images the reading position of the graduated circle on to a first light electric detector and the index mark on to a second light electric detector. When two reading positions are used to obtain the reading value then the first reading position is imaged on to the second reading position which, together with the index mark, lies in the object plane of the imaging system. The common arrangement of the reading position and the index mark in the object plane of the imaging system eliminates any inaccuracies of the optical components and hence, accidental measuring errors. So it is possible to do without a very complicated light electrical evaluation system.

3 Claims, 4 Drawing Figures

ARRANGEMENT FOR MEASURING ANGLES

This invention concerns an arrangement for measuring angles particularly for use in theodolites, comprising a graduated circle with at least one reading position which is imaged via an optical imaging system through an optical micrometer on to at least one light electric detector. Previous angle measuring devices are provided with a line division graduated circle and a micrometer for reading small angular values. The micrometer has a line mark which is in cooperation with one reading position of the line division in such a manner that the respective division line is captured and its position coordinated to a micrometer graduation. Since the graduated circle and the micrometer are arranged on different locations the optical means required to image the division lines and the line marks are subject to different external influences, such as mechanical stress, which involves measuring errors. Even when using light electrical detectors to read the angular values these measuring errors are not eliminated. Other known goniometers employ dials in which diametrally opposing reading positions are imaged upon each other to eliminate eccentricity errors of the graduated circle. Such arrangements permit reading operation in double motion in like or opposite sense. In order to make advantage of a light-electric evaluation in both cases, the double motion in opposite sense requires high expenditures for electronics. Since there is a great number of possibilities to correlate the reading positions in the capturing range of the micrometer, the electronic logic has to find out the correct correlation. In the event of double motion reading in like sense the division lines vary with respect to their width over the entire graduated circle when the circle is subject to eccentricity. Such a division line is captured by a line mark of the micrometer and the passed interval is read as the precise angular value. The different contrasts of the two imaged opposite reading positions of the graduated circle are, however, disadvantageous.

It is an object of the present invention to obviate the above disadvantages.

It is a further object of the present invention to provide an arrangement for reading angles which eliminates any instabilities inherent in and occuring in the course of imaging an angular position from the graduated circle into an image plane.

It is still a further object of the present invention to provide an arrangement for reading angles which does without complicated and expensive light-electric evaluation means.

These and other objects are realised in an arrangement for reading angles in which the division lines of a graduated circle and the measuring mark are imaged by a common optical system and measured by a common light electric micrometer.

According to the invention this is achieved by arrangement of an index mark in the object plane of the imaging system. The index mark, and the reading position are illuminated by one and the same light source. When a graduated circle is employed which has two diametrally opposing reading positions the index mark is located in the vicinity of one of the two opposing reading positions. In this connection it has to be made clear that the arrangement of the index mark in the object plane of the imaging system also includes those cases where the reading position and the index mark lie within the depth of the focus of the imaging system in the vicinity of the object plane or in two conjugate object planes of the imaging system. Advantageously, the index mark is located in the vicinity of that reading position upon which the diametrally opposing position is imaged. In a further advantageous embodiment a raster is employed as an index mark located in the vicinity of a reading position. The raster is arranged in such a manner that its virtual image lies in the plane of the reading position. With a further advantageous embodiment the index mark consists of an array of adjacent parallel lines.

Figure 2:
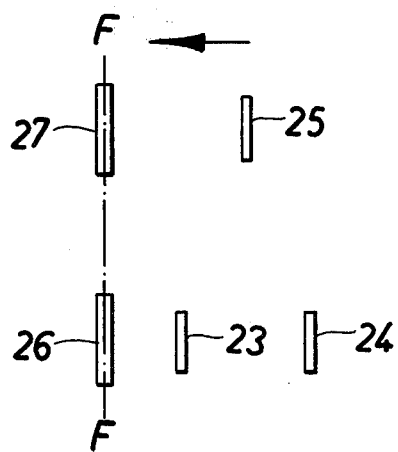
Figure 3:
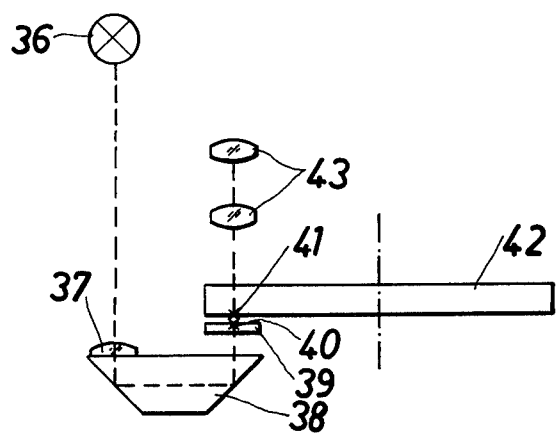
Figure 4:
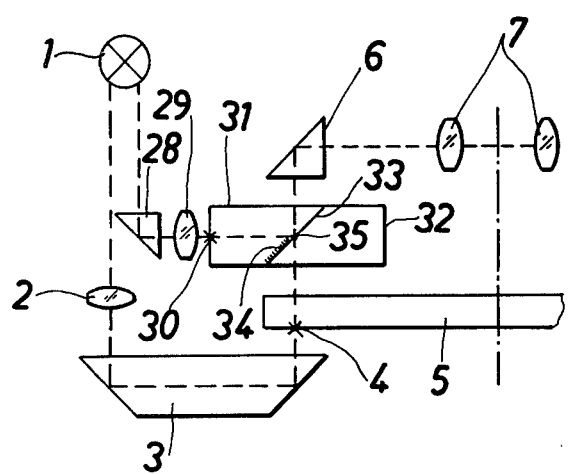

In order that the invention may be more readily understood reference is made to the accompanying drawings which illustrate diagrammatically and by way of example three embodiments thereof and in which:

FIG. 1 is a schematical view of a light-electric graduated circle having reading positions in diametral opposition including a first feasible arrangement of an index mark, FIG. 2 shows the principle view of a graduated circle reading according to the invention, FIG. 3 is a schematical view of a light-electric graduated circle with one reading position, and FIG. 4 is a schematical view of a part of a light-electric graduated circle with a second feasible arrangement of an index mark.

In FIG. 1 a light source 1 illuminates a first reading position 4 of a graduated circle 5 via a first optical system 2. The first reading position 4, in turn, is imaged through a prism 6, a second optical system 7 and a further prism 8 into the plane of a second reading position 9. The image of the reading position 4 and reading position 9 are projected upon two light-electric detectors 17, 18 after passage through a plate 10 which is provided with an index mark 11, and further through a prism 12, an optical imaging system 13, and an optical wedge 14, which is a non-displaceable component of an optical micrometer 15. An optical wedge 16 and a scale 19 coordinated to the former and the graduation lines of which are illuminated by a not shown illumination system, are moved together along a guide means 21 by operation of a servo-motor 20. The scale 19 is provided with a light electric detector 22 which serves as a reading member. In the following a reading operation is described. In the course of reading a position on a graduated circle, the reading position 4, illuminated by the light source 1 is imaged upon the reading position 9 which is in diametral opposition to the former position. Since the reading of the graduated circle is carried out in a double motion in like sense, any circle eccentricities are eliminated. The graduation line which is formed by both the reading positions 4 and 9 is imaged into the plane of the light-electric detector 17, and the index mark 11 is imaged into the plane of the light-electric detector 18. The images of the graduation line image and of the index mark image sweep the photo-sensitive areas of the light electric detectors 17, 18 by means of the non-displaceable wedge 14 and of the micrometer wedge 16 displaceable by operation of the servo-motor 20. The space between the graduation line and the index mark 11 is measured by the light-electric detector 22 in cooperation with the scale 19, the displacements of the latter correspond to the displacements of the wedge 16. The measuring of the space represents the fine reading in the course of the reading operation. At the two micrometer 15 stops (not shown) an automatic direction reversion is accomplished in such a manner that a control logic (not shown for the sake of simplicity) reverses the rotational sense of the servo-motor 20. The micrometer can also be embodied as a plane plate micrometer. The plate 10 can be provided with a plurality of index marks and permits adjustment at right angles or in parallel to the micrometer plane. In dynamic operation conventional light electric detectors will do, when, however, high demands concerning precision in a non-dynamic operation are required, differential light-electric detectors have necessarily to be employed.

In FIG. 2 the photo-sensitive faces 26, 27 of the light-electric detectors 17, 18 are arranged to lie along an axis F—F. 23 and 24 are the images of two graduation lines, and 25 the image of the index mark 11. Due to the operation of the micrometer 15 (FIG. 1) the images 23 and 24 of the graduation line 4 and the image 25 of the index mark 11 sweep the photosensitive faces along the direction indicated by an arrow. When the image 23 sweeps the photo-sensitive face 26 of the light-electric detector 17 the latter produces an electric signal, which triggers the light-electric detector 22 (FIG. 1) to count the light pulses derived from the scale 19 (FIG. 1). The electric pulses produced in the light-electric detector 22 are counted in a not shown forward (one-directional) counter. When the image 25 arrives at the photo-sensitive face 27 of the light-electric detector 18 the latter produces an electric pulse which stops the counting operation. The counting operation can also be started by pulses derived from the image 25 of the index mark 11 and is stopped when the image 24 of a subsequent graduation line sweeps the photo-sensitive face 26. In this event the light pulses are counted by the light electric detector 22 in reverse direction. The photo-sensitive faces 26, 27 of the light-electrical detectors 17, 18 have not necessarily to be arranged along a common axis, since any deviation provides a constant amount to the value counted. If desired this constant amount is compensated for by a respective adjustment of the plate 10 with the index mark 11 (FIG. 1) relative to the graduated circle 5. The sweeping of the photo-sensitive face 27 of the light-electric detector 18 by the image 25 of the index mark 11 is combined to a coarse angle reading based upon an absolute or additive (incremental) method.

In FIG. 3, a light source 36 illuminates a plate 39, provided with an index mark 40, via an optical imaging system 37 and a prism 38. A reading position 41 of a graduated circle 42 is arranged to lie in the same path of rays emitted by the light source 36 as the index mark 40 of the plate 39. The index mark 40 and the reading position 41 are imaged via an optical micrometer in analogy to FIG. 1 imaged upon light electric detectors, which are omitted in FIG. 3 for the sake of simplicity. The reading of the angular value is accomplished in analogy to FIG. 2.

In FIG. 4 like elements are designated with like numerals compared to FIG. 1. The light source 1 illuminates the reading position 4 via the optical imaging system 2 and the prism 3. A prism 31, half of the surface 33 of which is provided with a reflective layer 34, and a prism 32 are arranged above of the graduated circle 5. The light source 1 illuminates, via a prism 28 and a condensor lens 29, an index mark 30 disposed on the prism 31. The index mark 29 and the reading position 4 are combinedly imaged via the prism 6 and the imaging system 7 in the same manner as described in connection with FIG. 1. The index mark 25 and the reading position 4 are both equidistantly spaced from a point 35. In this manner it is achieved that both, the index mark 25 and the reading position 4 lie, considered from the optical imaging system 13 (FIG. 1), in the plane of the reading position 9 (FIG. 1). Hence it is feasible to arrange the light-electric detectors 17, 18 (FIG. 1) in a common plane, too. It is also possible to have the arrangement of the prisms 31, 32, followed by an imaging system 43 according to FIG. 3 with the respective reading system.

We claim:

1. An optical arrangement for measuring angles, comprising
   a graduated circle with at least one reading position,
   a light source for illuminating said reading position,
   an optical imaging system,
   an index mark,
      said reading position and said index mark being arranged in the object plane of said imaging system,
   an optical micrometer including optical wedges, at least one of said wedges being adjustable,
   means for displacing the one wedge, and
   means for measuring the displacement of said one wedge,
   a first and a second light-electric detector being arranged in the image plane of said imaging system,
      the first light-electric detector scanning the image of said reading position,
      the second light-electric detector scanning the image of said index mark;
   said light source, said reading position,
   said index mark, said imaging system, said optical micrometer and the light-electric detectors being in optical alignment.

2. An optical arrangement as claimed in claim 1, wherein the graduated circle is provided with a first and a second reading position, the second reading position and the index mark being located in said object plane, and being further provided with a second imaging system arranged between said first reading position and said second reading position for imaging said first reading position onto said second reading position.

3. An optical arrangement as claimed in claim 1, wherein the index mark is a line mark on a partially silvered prism.

* * * * *